June 21, 1966 R. J. KOERNER 3,257,650

CONTENT ADDRESSABLE MEMORY READOUT SYSTEM

Filed Dec. 3, 1963 6 Sheets-Sheet 1

INVENTOR.
RALPH J. KOERNER
BY Arthur Freilich
ATTORNEY

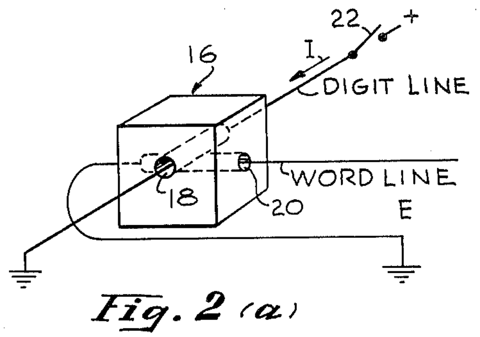
Fig. 2(a)
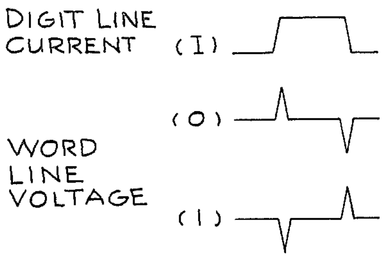
Fig. 2(b)
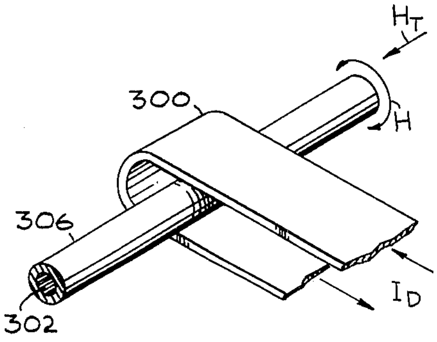
Fig. 9(a)
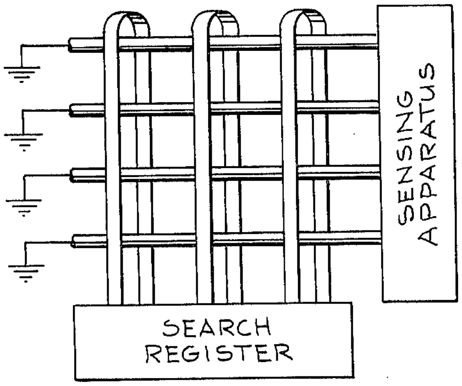
Fig. 9(b)
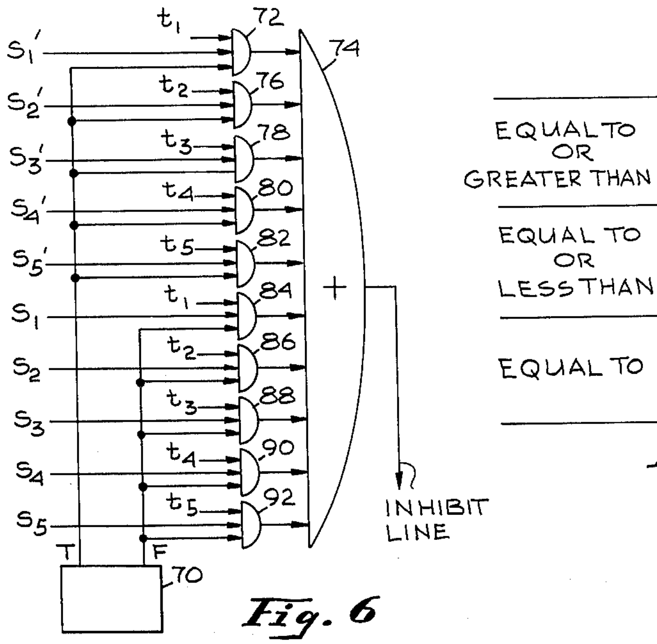
Fig. 6
| | SEARCH BIT | STORED BIT | SW CORE 50 | GENERATE INHIBIT PULSE |
|---|---|---|---|---|
| EQUAL TO OR GREATER THAN | 0 | 0 | | ✓ |
| | | 1 | ✓ | ✓ |
| | 1 | 0 | ✓ | |
| | | 1 | | |
| EQUAL TO OR LESS THAN | 0 | 0 | | |
| | | 1 | ✓ | |
| | 1 | 0 | ✓ | ✓ |
| | | 1 | | ✓ |
| EQUAL TO | 0 | 0 | | |
| | | 1 | ✓ | |
| | 1 | 0 | ✓ | |
| | | 1 | | |
Fig. 5
INVENTOR.
RALPH J. KOERNER
BY Arthur Freilich
ATTORNEY INVENTOR.
RALPH J. KOERNER
BY Arthur Freilich
ATTORNEY INVENTOR.
RALPH J. KOERNER
BY Arthur Freilich
ATTORNEY INVENTOR.
RALPH J. KOERNER
BY Arthur Friedrich
ATTORNEY

CONTENT ADDRESSABLE MEMORY READOUT SYSTEM

Filed Dec. 3, 1963 6 Sheets-Sheet 6

INVENTOR.
RALPH J. KOERNER
BY Arthur Frelich
ATTORNEY

United States Patent Office 3,257,650

Patented June 21, 1966

3,257,650

CONTENT ADDRESSABLE MEMORY READOUT SYSTEM

Ralph J. Koerner, Canoga Park, Los Angeles, Calif., assignor, by mesne assignments, to The Bunker-Ramo Corporation, Stamford, Conn., a corporation of Delaware Filed Dec. 3, 1963, Ser. No. 327,595
11 Claims. (Cl. 340—174)

This invention relates generally to digital memories and more particularly to means for reading out information from content addressable memories, such memories having the ability to permit all words stored in the memory to be searched in parallel, i.e. simultaneously.

U.S. Patent No. 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof, hence, the name content addressable memory.

As a result of selecting locations on the basis of stored information, memory search times can be considerably reduced at the cost of some additional hardware. That is, in situations where it is desired to select those locations, out of N locations in memory, storing information (words) identical to a search word, information identifying those locations can be derived in one memory access period instead of the N such periods required by conventional digital memories. More particularly, whereas it is necessary in a conventional digital memory to sequentially access the contents of each location (a word) and compare each such word for identity with a search word, comparison of the search word with all the stored words can be simultaneously effected in a content addressable memory.

Essentially, a content addressable memory operates by causing a search signal representative of a search word bit to be applied simultaneously to all memory location elements storing bits of corresponding significance. Some type of logic means is provided at each element in the memory, such means being operable to generate a signal to indicate whether the bit stored in the associated element is the same as (i.e., matches) or different from (i.e., mis-matches) the corresponding search bit being sought. All logic means associated with elements of a single memory location are connected to a common word line and by sensing the signals applied to a word line, a determination can be made as to whether or not the word stored in the memory location associated with the word line is identical to the search word.

In U.S. patent application Serial No. 269,009, filed Mar. 29, 1963, by Ralph J. Koerner and Alfred D. Scarbrough and assigned to the same assignee as the present application, an extremely useful content addressable digital memory is disclosed which utilizes only one storage element per stored bit of information. In that invention, advantage is taken of a little known characteristic of a class of magnetic elements employing orthogonal magnetic fields. Typical of this class is the Biax which is discussed by C. L. Wanlass and S. B. Wanlass in a paper entitled "Biax High Speed Magnetic Computer Element," 1959, WESCON, Convention Record, Part IV, pages 40, 54. Normally, when a magnetic element of this class is interrogated, two successive output pulses of opposite polarity are provided and the state of the element is sensed by determining whether a positive-going or negative-going output pulse occurred first. The characteristic relied on in that patent application is that such output pulses occur concurrently with a change in the interrogation current level, i.e. when the interrogation current level is changed in a first direction, e.g. increased, a positive-going output pulse is developed if the element is in a first state (arbitrarily storing a binary 0) and a negative-going output pulse is developed if the element is in a second state (arbitrarily storing a binary 1). On the other hand, when the interrogation current level is changed in a second direction, e.g. decreased, a positive-going output pulse is developed if the element stores a binary 1 and a negative-going output pulse is developed if the element stores a binary 0. For simplicity, positive and negative-going pulses will hereafter merely be referred to as positive and negative pulses, it being understood however that in actuality a D.C. level might be present which would make the former terms technically more accurate.

The content addressable memory disclosed in the cited patent application takes advantage of this recognized characteristic by using an interrogation current changing in a first direction to represent a first state of a search bit and an interrogation current changing in an opposite direction to represent a second state of a search bit inasmuch as a consequence of this, output signals of a first polarity can always be interpreted as either a match or mismatch signal. In a preferred embodiment of that invention, an increasing interrogation current level is used to represent a search word bit of 1 and a decreasing interrogation current level is used to represent a search word bit of 0. Consequently, positive output signals generated by the elements are always interpreted as mis-match signals.

In order to conduct a search, the bits of the search word are processed sequentially. That is, the interrogation currents representative of different search word bits are increased or decreased separately and therefore, only one element in each memory location can possibly provide an output pulse on a location word line at any one time. Therefore, the signal-to-noise ratio on the word line is exceptionally high. Moreover, by processing the search word bits in order of decreasing significance, "greater than" and "less than" magnitude comparison searches can be readily accomplished by merely looking at the state of the search word bit associated with the first mismatch signal developed in any location. That is, if the first mismatch signal on a word line is developed when the search word bit being processed as a 1 the magnitude of the associated stored word must necessarily be less than the magnitude of the search word and on the other hand if the first mismatch signal is developed when the search word bit being processed is a 0 the stored word must necessarily be greater than the search word.

In a preferred embodiment of the invention disclosed in the cited patent application, a rectangular matrix of Biax elements is provided with all of the elements common to each row being interconnected by a word line unique to that row and all of the elements common to each column being interconnected by a digit line unique to that column. A search register including a plurality of flip-flop circuits equal in number to the number of columns in the matrix, is provided. Each of the flip-flop circuits is connected through appropriate gating circuitry to a different transistor, each transistor being respectively connected to a different digit line.

Prior to performing a search, interrogation current is initiated in those digit lines corresponding to search register bit positions storing a 0. Timing means are provided to sequentially activate the gating circuitry associated with each flip-flop, in order of decreasing significance, so as to effectively cut off the interrogation current in each digit line associated with a search bit of 0 and initiate interrogation current in each digit line associated with a search bit of 1. A different sensing device is connected to each word line, each sensing device including a first bistable element responsive to positive pulses appearing on the word line to switch to a second state. At the termination of a search, equality between a stored word and the search word can be determined by merely determining whether the first bistable element associated with the stored word has switched to the second state or has remained in the first state. It is pointed out that the first bistable element need only respond to the initial positive pulse appearing on the word line and any subsequent positive or negative pulses can be ignored.

In order to extend the capabilities of the content addressable memory to permit it to perform "greater than" and "less than" magnitude comparison searches as well as equality searches, each of the sensing devices is connected to a second bistable element such that the second bistable element is switched in response to the associated first bistable element being switched unless an inhibit signal is simultaneously applied to the second bistable element. That is, if the second bistable elements are all initially in a first state and their assumption of a second state indicates mismatch, an inhibit signal will be generated if for example a "greater than" search is being conducted when the interrogation current in a digit line associated with a search bit of 0 is being decreased. In other words, when the search bit is equal to 0 and a mismatch signal is generated by the first bistable element, the corresponding stored bit is necessarily equal to binary 1 which of course indicates that the stored word is greater in magnitude than the search word and as a consequence the stored word can be considered as matching the search word according to the "greater than" criterion established. Therefore, the second bistable element should be inhibited from switching to a second or mismatch state.

By utilizing a selection device, for example, of the general type disclosed in U.S. patent application Serial No. 296,001, filed July 18, 1963, Robert N. Mellott, or Serial No. 296,053, filed July 18, 1963, R. J. Koerner et al., the states of the second bistable elements can be sequentially examined to select the matching words and initiate further operations with respect to these words. Such further operations can selectively involve, for example, merely reading out an address identifying the location of a matching word, reading out or modifying a corresponding word from another memory, or reading out or modifying the very word in the content addressable memory whose contents gave rise to the match indication.

It is an object of the present invention to provide in a content addressable memory of the above-described type, means for reading out selected stored words.

It is a more particular object of the present invention to provide means in a content addressable memory of the above-described type for reading out stored words identified by match indications.

In accordance with the present invention, means are provided in a content addressable memory for initiating readout operations and for processing a different match indication during each readout operation to cause the bits of a stored word associated with the processed match indication to be read out of the memory into a register.

In a first embodiment of the invention, all the bits of each word read out of the content addressable memory, are read out in parallel. Parallel readout is effected by providing a plurality of word select lines each of which is associated with all of the storage elements of a different one of the memory locations. In addition, a plurality of digit sense lines are provided, with each digit sense line being associated with a different corresponding digit in all of the memory locations. Gating means coupled the output of a selection device to the word select lines so as to enable each match indication to activate a different word select line. Activation of a word select line causes the contents stored in the elements thereof to be read out on the plurality of digit sense lines.

In a second and preferred embodiment of the invention, bits of stored words are read out in series, rather than in parallel, resulting in a considerable hardware cost reduction over the first embodiment of the invention. Serial readout is accomplished through the utilization of the same apparatus utilized to sequentially activate the digit lines for search purposes. The sensing devices connected to the word lines for the purpose of detecting mismatch signals during a search operation are employed to sequentially recognize the identity of the bits of a selected word during a readout operation. The output of the sensing device associated with the selected memory location is coupled to the input of a shift register during a readout operation. By providing a shift pulse to the shift register concurrent with the activation of each digit line, the bits of a selected word location are serially read out and stored in the shift register. When the content addressable memory is utilized in accordance with the second embodiment of the invention, no wiring modification of the memory matrix, over that which is needed for search operations, is required. The second embodiment of the invention, in addition to being less expensive than the first embodiment of the invention, can be used with certain types of memory elements which require serial readout. Exemplary of this latter type of element is the wire memory element, disclosed by T. R. Long in an article entitled "Electro-deposited Memory Elements for a Nondestructive Memory" which appeared in the Journal of Applied Physics, vol. 31 (May 1960) pages 123–124.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of a content addressable memory including a first embodiment of a readout system therefor;

FIG. 2*a* is a perspective view of a typical Biax element showing the manner in which interrogation and sense lines are threaded therethrough;

FIG. 2*b* is a waveform chart showing output voltage waveforms developed on the Biax sense line as a result of the application of the illustrated current waveforms to the interrogation line;

FIG. 3*a* is a schematic diagram illustrating a first embodiment of a sensing apparatus suitable for use with the embodiment of the invention illustrated in FIG. 1;

FIG. 3*b* is a schematic diagram illustrating a second embodiment of a sensing apparatus suitable for use with the embodiment of the invention illustrated in FIG. 1;

FIG. 4 comprises a plurality of waveform charts illustrating an exemplary search operation of the content addressable memory;

FIG. 5 is a table describing the conditions under which inhibit signals should be generated;

FIG. 6 is a schematic diagram illustrating logic means for generating inhibit signals for utilization in the sensing apparatus of FIG. 3*a* or 3*b*;

Figure 7:
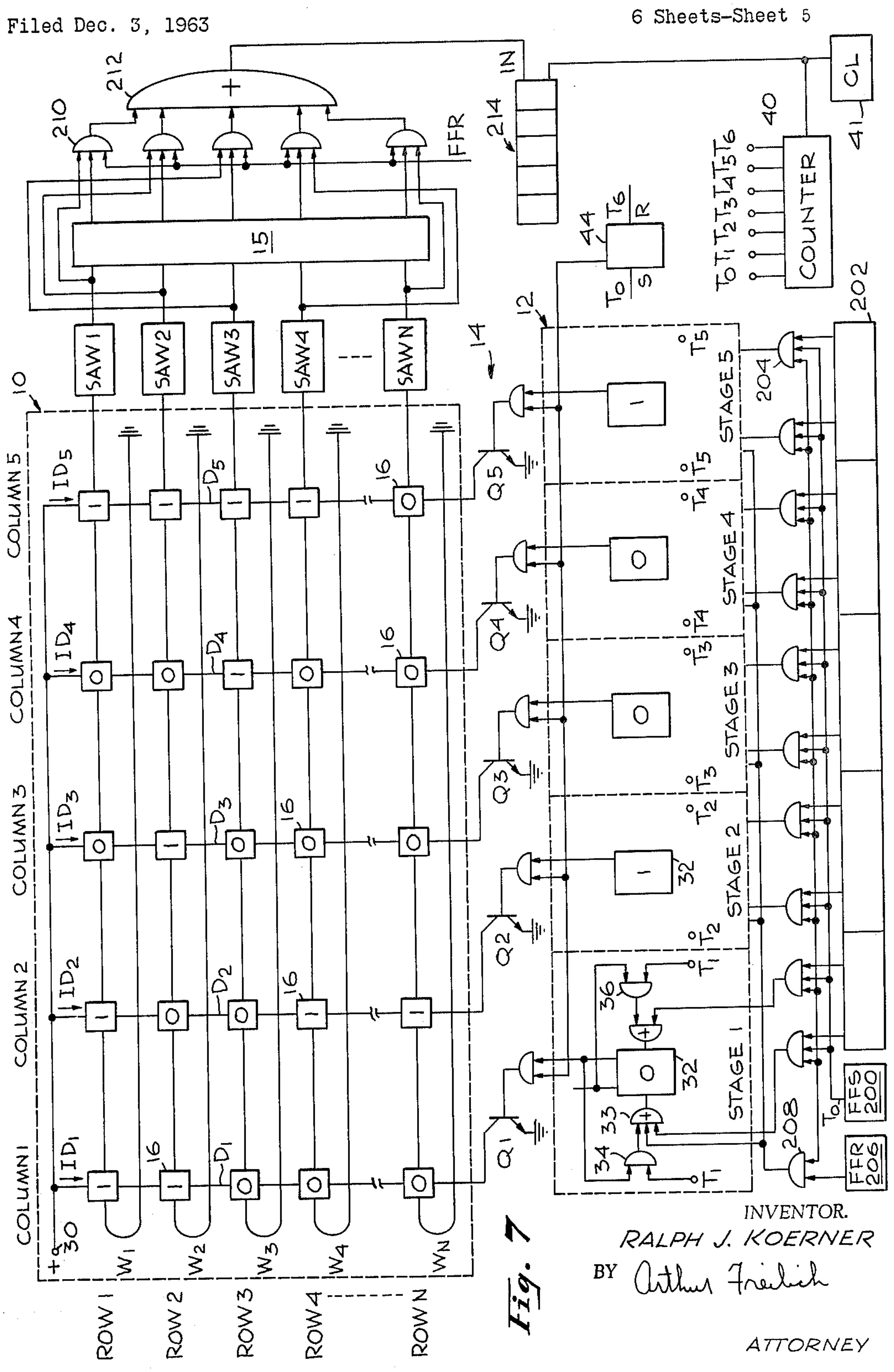
FIG. 7 is a schematic diagram of a content addressable memory including a second embodiment of readout means therefor.
Figure 8:
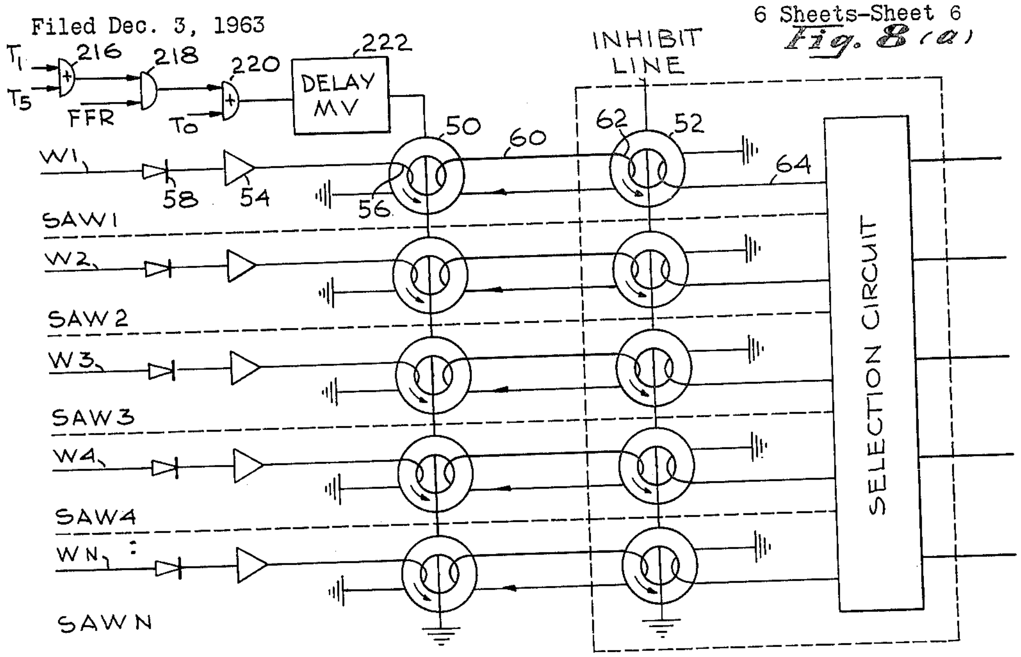
Figure 8:
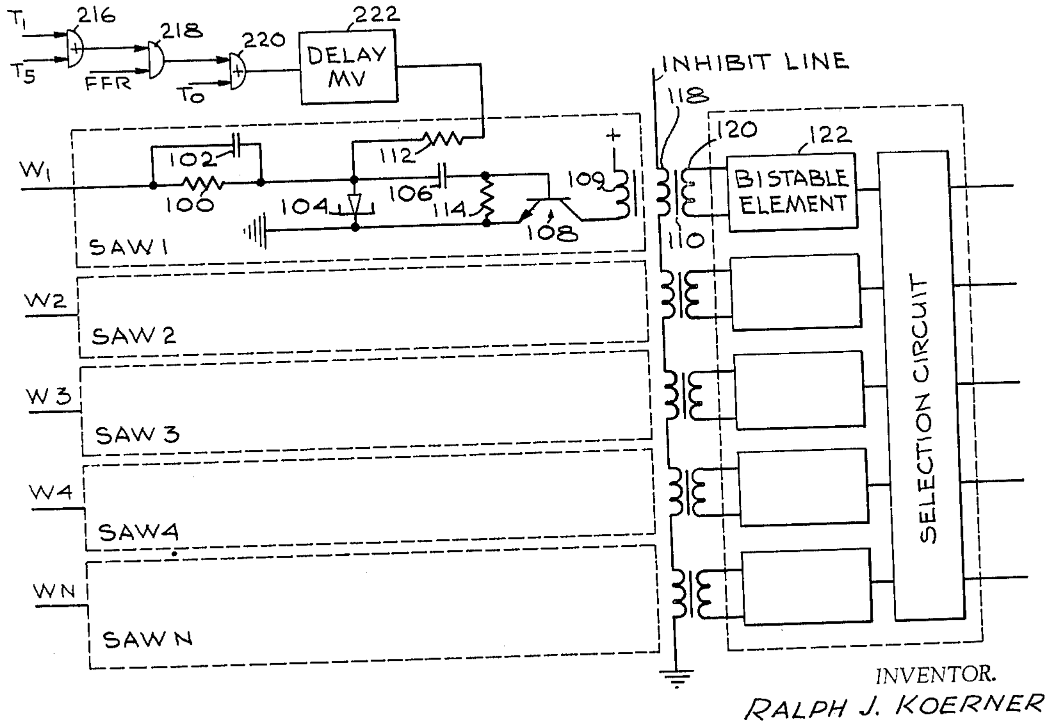

FIG. 8*a* is a schematic diagram illustrating a first embodiment of a sensing apparatus suitable for use with the second embodiment of the invention illustrated in FIG. 7;

FIG. 8b is a schematic diagram illustrating a second embodiment of a sensing apparatus suitable for use with the second embodiment of the invention illustrated in FIG. 7;

FIG. 9a is a perspective fragmentary view of wire memory elements; and

FIG. 9b is a perspective view showing a matrix of wire memory elements.

Figure 1:
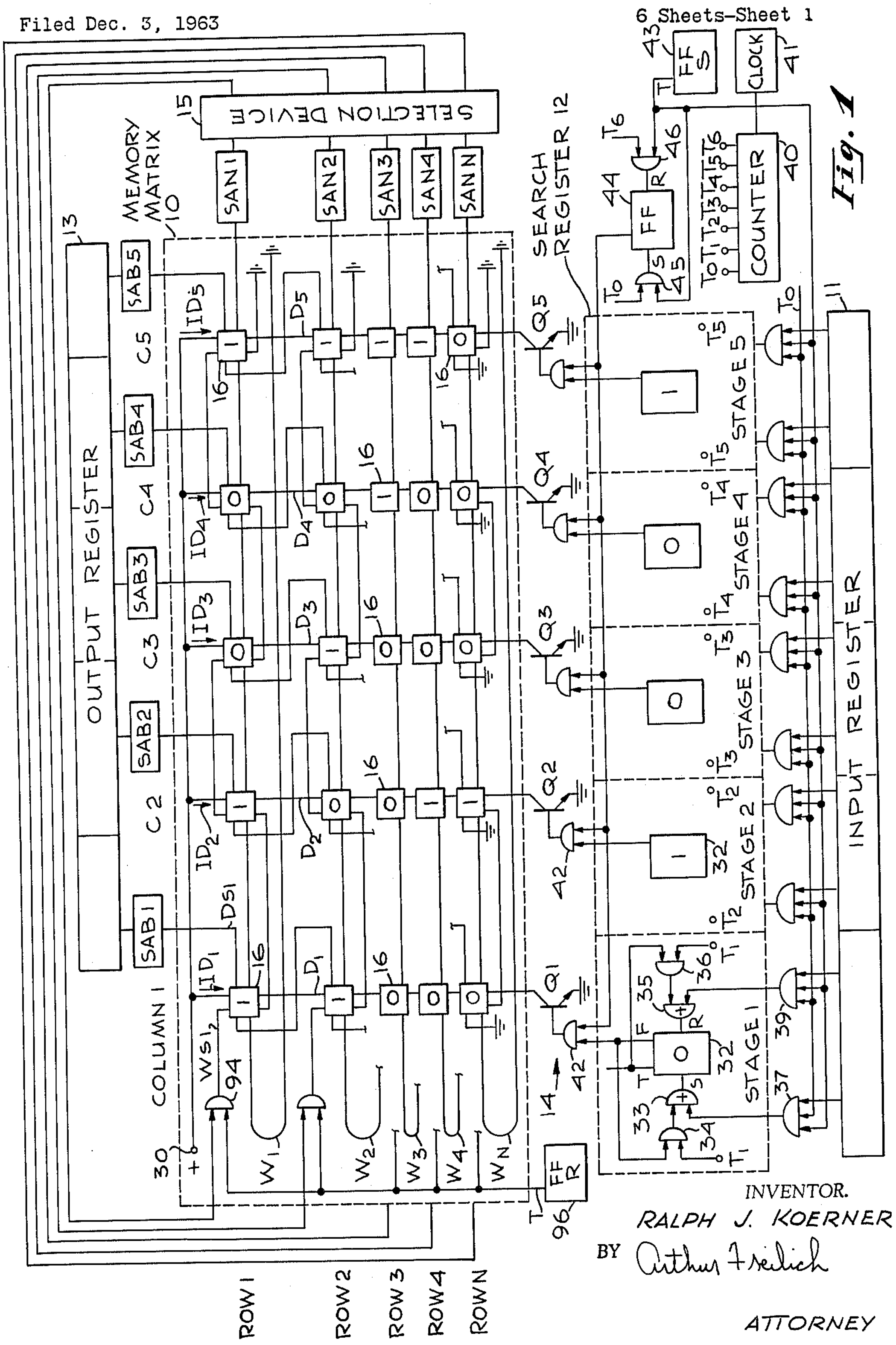

Attention is now called to FIG. 1 which illustrates a content addressable memory including a readout system comprising a first embodiment of the present invention. Essentially, the apparatus of FIG. 1 includes a memory matrix 10, an input register 11, a search register 12, an output register 13, interconnecting circuit means 14 between the matrix 10 and search register 12 and a selection device 15.

The exemplary matrix 10 includes N rows of memory elements, each row comprised of five memory elements 16. Each of the memory elements 16 constitutes a bistable device thereby enabling it to assume first and second states respectively representative of binary digits or bits, namely 0 and 1. Each of the matrix rows can appropriately be referred to as a memory location, each location being capable of storing a bit pattern constituting a single word. Although the exemplary memory illustrated herein makes use of a five bit word length, it is pointed out that a memory of any arbitrary word length can be constructed in accordance with the invention.

Each of the matrix columns consists of a plurality of memory elements each of which serves to store information of corresponding significance in a different row or memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of columns 2 through 5 in the matrix respectively store bits of decreasing significance.

A digit line $D_1$ is associated with all of the memory elements 16 of column 1 of the matrix. Similarly, digit lines $D_2$, $D_3$, $D_4$, and $D_5$ are each correspondingly associated with all of the memory elements of respectively different ones of the columns 2, 3, 4, and 5 of the matrix. On the other hand, a word line $W_1$ is associated with all of the memory elements in row 1 of the matrix. Similarly, word lines $W_2$, $W_3$, $W_4$, and $W_N$ are correspondingly associated with the memory elements of rows 2, 3, 4, and N of the matrix.

Attention is now momentarily called to FIG. 2a showing a perspective view of a structural device constituting a memory element suitable for use in the memory matrix 10 of FIG. 1, the operational characteristics of such a memory element being illustrated in FIG. 2b.

FIG. 2a illustrates a magnetic memory element 16 commonly called a Biax. Such an element comprises a block of magnetic material having an interrogation aperture 18 extending therethrough and a sense aperture 20 extending therethrough perpendicularly to the interrogation aperture. A digit line is threaded through the aperture 18 and a word line is threaded through the aperture 20. The digit line is utilized as a conduction path for carrying current to interrogate the state of the element 16 and as a consequence is connected between ground and a switch 22 which in turn is connected to a source of positive potential. The word line is utilized to sense the state of the element 16. For the purposes of the discussion herein, it will be assumed that information has already been written into the memory element 16 and that the element is either in a first state of magnetization arbitrarily referred to as a binary 0 or second state of magnetization arbitrarily referred to as a binary 1.

In order to determine the state of the element 16, the switch 22 in the digit line is closed to thereby initiate a positive current pulse on the digit line as illustrated in FIG. 2b. If it is initially assumed that the memory element 16 stores a 0, as a result of the interrogation current, a positive voltage pulse will be initially generated on the word line followed by the generation of a negative pulse. If on the other hand the element 16 stores a 1, a positive current pulse on the digit line initially causes a negative voltage pulse to appear on the word line followed by the appearance of a positive pulse.

As explained in the above referenced article regarding the Biax, state interrogations can be accomplished nondestructively. That is, although the current driven through the digit line will induce voltage pulses on the word line, the current will not change the state of the memory element 16. The state of the element of course can be determined by sensing whether the initial pulse appearing on the word line is positive or negative. If a positive pulse is initially generated followed by a negative pulse, the element 16 of course stores a 0 and on the other hand, if a negative voltage pulse is initially generated followed by a positive pulse, the element 16 stores a 1.

It is to be further noted from FIG. 2b that the voltage pulses on the word line are generated concurrently with a change in the current in the digit line. That is, if the element 16 stores a 0, a positive voltage pulse is generated during an increase in current in the digit line and a negative voltage pulse is generated during a decrease in current in the digit line. No pulse appears on the word line when the current in the digit line is not changing. It is this characteristic of the Biax and other memory elements employing orthogonal magnetic fields which is exploited to provide a considerably improved content addressable memory.

Returning to FIG. 1, it is pointed out that each of the digit lines is connected between a terminal 30, which in turn is connected to a positive potential source, and the collector of a respective transistor. That is, digit line $D_1$ is connected to the collector of transistor $Q_1$, digit line $D_2$ is connected to the collector of transistor $Q_2$, and digit lines $D_3$, $D_4$, and $D_5$ are respectively connected to the collectors of transistors $Q_3$, $Q_4$, and $Q_5$. The emitters of each of the transistors $Q_1$–$Q_5$ are all connected to ground.

The search register 12 includes five stages, each stage of which corresponds to one of the memory matrix columns. All of the search register stages are substantially identical and each includes a bistable element 32 which can comprise a conventional set-reset flip-flop circuit having set and reset input terminals and true and false output terminals. It will be assumed that the flip-flop circuits are so designed that when a circuit stores a binary 1, its true output terminal will be at a high potential and when a circuit stores a binary 0, its false output terminal will be at a high potential.

Each of the flip-flop circuits 32 has the output of an OR gate 33 connected to the set input terminal thereof and the output of an OR gate 35 connected to the reset input terminal thereof. The outputs of AND gates 34 and 37 are connected to the input of OR gate 33 and the outputs of AND gates 36 and 39 are connected to the inputs of OR gate 35. The false output terminal of the flip-flop is connected to the input of AND gate 34 and the true output terminal of the flip-flop is connected to the input of AND gate 36.

A counter 40 is provided which is capable of successively applying pulses to each of its output terminals $T_0$, $T_1$, $T_2$, $T_3$, $T_4$, $T_5$, $T_6$, the pulses being respectively designated by the nomenclature $t_0$, $t_1$, $t_2$, $t_3$, $t_4$, $t_5$, $t_6$. The output terminal $T_1$ of the counter 40 is connected to the input of both AND gates 34 and 36 of stage 1 of the search register. The false output terminal of the flip-flop circuit of stage 1 is connected to the input of AND gate 42. The output of this AND gate 42 is connected to the base of transistor $Q_1$. The other search register stages are similarly connected, e.g. the output terminal $T_2$ of counter 40 is connected to the AND gates 34 and 36 of search register stage 2 and the output of the AND gate 42 associated therewith is connected to the base of transistor $Q_2$.

A search control flip-flop 43 is provided which is selectively set in order to initiate a search operation. The true output terminal of flip-flop 43 is connected to the inputs of AND gates 45 and 46. The output terminal $T_0$ of counter 40 is connected to the input of AND gate 45 whose output is connected to the set input terminal of flip-flop 44 and the output terminal $T_6$ of counter 40 is connected to the input of AND gate 46 whose output is connected to the reset input terminal of flip-flop 44. The true output terminal of flip-flop 44 is connected to the input of all of the AND gates 42.

The input register 11 consists of five stages, each stage having a pair of complementary output terminals respectively connected to the input of AND gates 37 and 39. A second input to AND gates 37 and 39 comprises counter output terminal $T_0$. A third input to AND gates 37 and 39 comprises the true output terminal of search control flip-flop 43.

Figure 4:
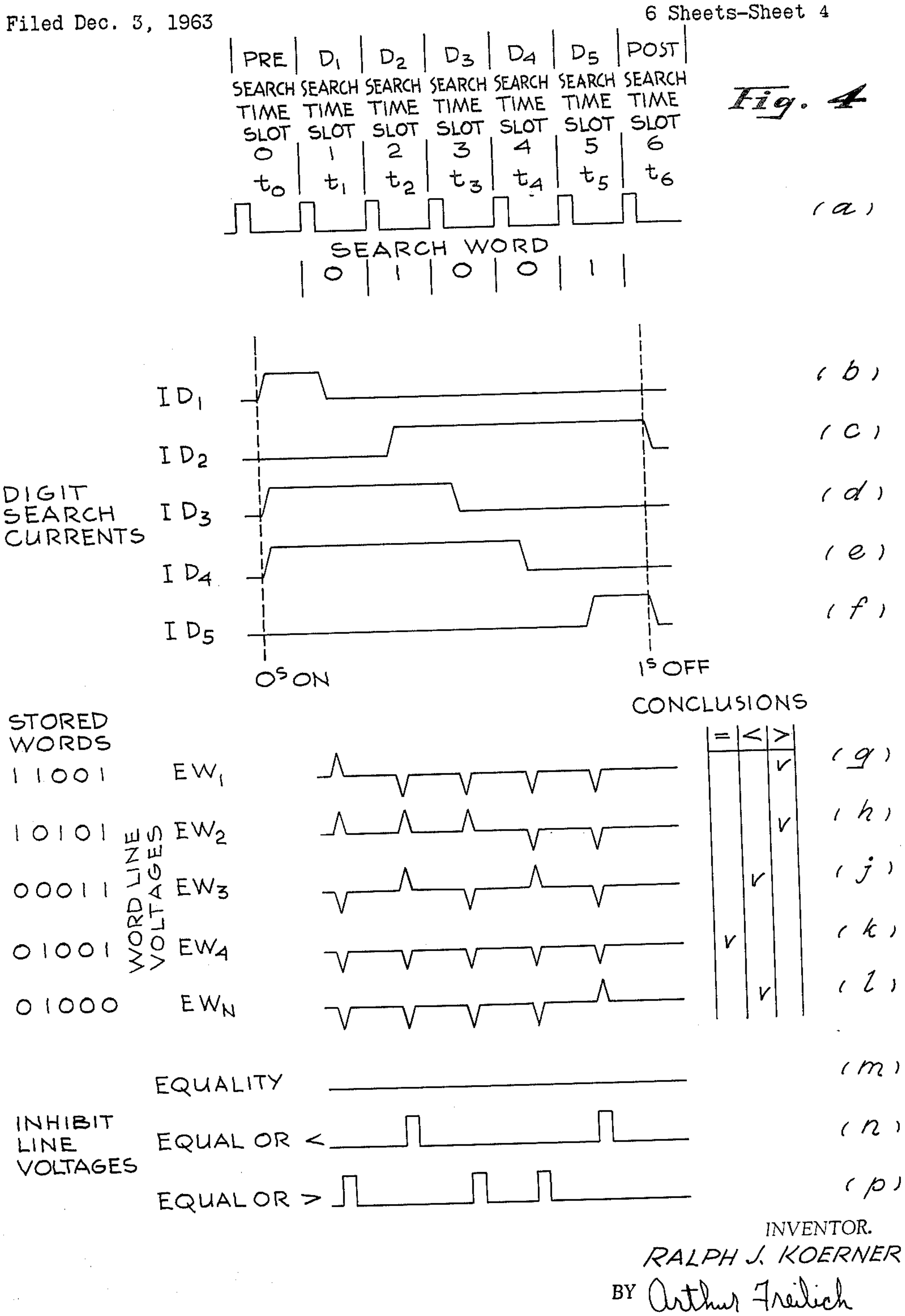

In order to understand the manner in which the content addressable memory of FIG. 1 can be operated to perform a search operation, let it be assumed that the memory elements of each of the memory locations store the bits as indicated by the numbers within the boxes in FIG. 1 representative of the memory elements. Let is further be assumed that it is desired to determine whether or not any of the words stored in the memory locations are identical to the search word stored in the search register 12, the search word being represented by the numbers disposed in the boxes representative of the flip-flop circuits 32. For ease in comprehension, FIGS. 1 and 4 should be considered together in the light of the following explanation. Line *a* of FIG. 4 illustrates the timing pulses provided by counter 40. The timing pulses $t_0$–$t_6$ may be considered as defining time slots so that e.g. a zero time slot is defined between the leading edge of timing pulse $t_0$ and between the leading edge of timing pulse $t_1$. The zero time slot may be considered as a pre-search time slot in which appropriate search conditions are set up in the equipment of FIG. 1 but during which no searching is actually performed. The time slots 1 through 5 are utilized to respectively search the elements of columns 1 through 5 and compare those elements with the correspondingly positioned bits in the search register. The sixth time slot may be considered as a post-search time slot during which the equipment of FIG. 1 is restored to a quiescent condition.

It will be recalled from FIG. 2*b* that an increasing current in a digit line results in the generation of a positive voltage pulse on a word line if the element stored a binary 0 and a negative pulse if the element stored a binary 1 and on the other hand that a decrease in the current in the digit line resulted in the generation of a negative voltage pulse on the word line if a binary 0 was stored and a positive pulse if a binary 1 was stored. It can therefore be seen that if the current on a digit line is increased when the corresponding bit of the search word is a 1, and decreased if the corresponding bit of the search word is a 0, positive voltage pulses resulting on the word lines can be interpreted as meaning that the memory elements generating the positive pulses store a different binary bit than the corresponding search bit.

In accordance with the above statement, in response to timing pulse $t_0$, transistors $Q_1$, $Q_3$, and $Q_4$ are forward-biased to establish current in digit lines $D_1$, $D_3$, and $D_4$. It should be apparent that transistors $Q_1$, $Q_3$ and $Q_4$ are forward-biased as a result of the generation of timing pulse $t_0$ due to the fact that the false output terminals of the flip-flop circuits of stages 1, 3, and 4 of the search register are at a high potential representative of a stored 0, and the true output terminal of flip-flop 44 enables AND gates 42 to thereby appply high potentials to the bases of transistors $Q_1$, $Q_3$, and $Q_4$. Since stages 2 and 5 of the search register store binary 1's, transistors $Q_2$ and $Q_5$ are not forward-biased and no current will exist in digit lines $D_2$ and $D_5$.

In response to the generation of timing pulse $t_1$, the flip-flop circuit 32 of stage 1 of the search register will switch from its binary 0 state to a binary 1 state inasmuch as the AND gate 34 will provide a signal to the set input terminal thereof. As a consequence of course, transistor $Q_1$ will be cut off (line *b*, FIG. 4) so as to decrease the current in digit line $D_1$. As a result, positive voltage pulses (lines *g* and *h*, FIG. 4) will be generated on the word lines $W_1$ and $W_2$ while negative voltage pulses (lines *j*, *k*, *l*, FIG. 4) will be generated on the word lines $W_3$, $W_4$ and $W_N$. It should be apparent from what has been so far set forth that the positive voltage pulses generated on word lines $W_1$ and $W_2$ can be interpreted as meaning that the elements in column 1 of memory locations 1 and 2 store a binary bit which is different from the bit stored in stage 1 of the search register.

In response to timing pulse $t_2$, the flip-flop circuit 32 of stage 2 of the search register is switched from a binary 1 state to a binary 0 state and thus forward-biases transistor $Q_2$ to thereby increase the current (line *c*, FIG. 4) in the digit line $D_2$. As a consequence, positive voltage pulses are generated on word lines 2 and 3 (lines *h* and *j*, FIG. 4) indicating that the elements in column 2 of memory locations 2 and 3 store binary bits different from that stored by the second stage of the search register.

In response to the generation of timing pulse $t_3$, transistor $Q_3$ is cut off in the same manner that transistor $Q_1$ was previously cut off. As a consequence, a positive pulse is generated on word line 2 (line *h*, FIG. 4). In response to the generation of timing pulse $t_4$, transistor $Q_4$ is cut off and as a consequence a positive pulse is generated on word line 3 (line *j*, FIG. 4). In response to the generation of timing pulse $t_5$, transistor $Q_5$ is biased on and as a consequence the current is increased in digit line $D_5$ thereby causing a positive pulse to be generated on word line $W_N$. In response to the generation of timing pulse $t_6$, transistors $Q_2$ and $Q_5$ are cut off (lines *c* and *f*, FIG. 4).

It is to be noted from lines *g*, *h*, *j*, *k*, and *l* of FIG. 4 that positive voltage pulses were generated on each of the word lines other than word line $W_4$. The voltage pulses can of course be interpreted as meaning that only the word stored in memory location 4 matches the search word stored in the search register. Accordingly, on line *k* of the table designated "Conclusions," the word in location 4 is checked as being equal to the search word.

It accordingly has been shown that the content addressable memory of FIG. 1 can be operated to simultaneously search all words stored in memory to determine whether or not any of the stored words match (i.e., for equality) a search word stored in the search register. Although all of the words were searched simultaneously in the sense that corresponding bits of all of the words were simultaneously considered, it is to be noted that the bits of each word were considered sequentially. As a consequence, it was not possible for more than one element during any one time slot to generate a pulse on a particular word line. Consequently, the signal-to-noise ratio on each of the word lines is exceptionally high.

In addition to utilizing the content addressable memory of FIG. 1 to determine whether any of the stored words are equal to the search word, the content addressable memory can be easily employed to locate stored words whose magnitude is "greater than" or "less than" the search word. In order to understand how this can be accomplished, consider the positive voltage pulses generated on word lines 1 and 2 during time slot 1 when a current in digit line 1 representative of a search bit equal to binary 0 is being processed. It follows that if the stored bit is not equal to the search bit, as evidenced by the generation of a positive pulse on the word line, and if the search bit is a binary 0, then the stored bit must necessarily be greater than the search bit. Similarly, as evidenced by the positive pulses on word lines $W_2$ and $W_3$ generated during time slot 2, when a search bit equal to a binary 1 is processed, it is apparent that if the stored bits are not equal to the search bit, then the stored bit must necessarily be less than the search bit.

It should of course be apparent that whether the magnitude of a complete word is greater than or less than the magnitude of another complete word is determined solely by the most significant bit in the stored word which differs from the corresponding bit in the search word. That is, upon the generation of the positive voltage pulse in time slot 1 on word line $W_1$, it can be immediately concluded that the magnitude of the word stored in location 1 is greater than the search word. Similarly, the positive pulse in time slot 1 on word line $W_2$ can be interpreted as meaning that the magnitude of the word stored in location 2 is greater than the search word. On the other hand, the positive voltage pulse generated on word line $W_3$ in time slot 2 can be interpreted as meaning that the magnitude of the word stored in memory location 3 is less than the search word. The positive pulse generated on word line $W_2$ during time slot 2 can be ignored for purposes of determining whether the word in location 2 is greater or less than the search word inasmuch as the positive pulse generated on word line 2 during time slot 1 conclusively established that the word stored in memory location 2 was greater than the search word. A consideration of the positive voltage pulses on the lines *g, h, j, k,* and *l* of FIG. 4 together with a consideration of the value of the search bits processed during the time slots in which the positive pulses were generated, leads to the conclusions indicated in the "Conclusions" table. That is, the words stored in memory locations 1 and 2 are greater than the search word, the words stored in memory locations 3 and N are less than the search word, and the word stored in memory location 4, as previously noted, is equal to the search word.

Although it is a relatively easy task to determine from the waveforms of FIG. 4 whether each stored word is equal to, greater than, or less than the search word, it is of course desirable to provide sensing apparatus adapted to be connected to the word lines for automatically sensing the pulses on the word lines and for operating some indicating means to indicate whether each of the stored words matches or mismatches the search word within some established criterion. More particularly, it is often desirable to be able to search through a memory storing words to determine which words have magnitudes which are equal to or greater than a search word and which words have magnitudes which are equal to or less than a search word. If an "equal to or greater than" criterion is established, all stored words having a magnitude which is equal to or greater than the search word are considered to match the search word and all stored words having magnitudes which are less than the search word are considered to mismatch the search word. On the other hand, if an "equal to or less than" criterion is established, all stored words whose magnitudes are equal to or less than the search word are considered to match the search word and all stored words having magnitudes which are greater than the search word are considered to mismatch the search word.

Attention is now called to FIG. 3*a* which illustrates a first embodiment of a sensing apparatus which can be utilized with the content addressable memory of FIG. 1 for monitoring the word lines and generating appropriate match and mismatch signals in accordance with an "equal to or greater than" or "equal to or less than" criterion established.

The sensing apparatus of FIG. 3*a* includes N sensing devices and a selection device 48 having N stages and a selection circuit 49. Inasmuch as the apparatus of FIG. 3*a* associated with each of the word lines is identical, detailed attention will be directed only to the apparatus connected to word line $W_1$ which includes a sensing device SAW1 comprised of a first bistable device 50 such as a conventional single aperture magnetic core. Stage 1 of the selection device 48 includes a bistable device 52 which also can be a magnetic core. The word line $W_1$ is connected through a diode 58 and ground referenced amplifier 54 to a first terminal of a drive winding 56 on core 50. The second terminal of drive winding 56 is connected to ground. A sense winding 60 is threaded through core 50 and is connected to a drive winding 62 threaded through core 52. An inhibit line is threaded through the cores 52 of each of the N stages. A sense winding 64 is threaded through core 52 and connected to the selection circuit 49.

In the operation of the sensing apparatus of FIG. 3*a*, let it be initially assumed that all of the cores 50 and 52 are in a first state of magnetization as represented by the arrows drawn thereon. The cores can be initially switched to the first state in response to timing pulse $t_0$ by the application of appropriate pulses to respective drive windings (not shown). When a positive voltage pulse is generated on word line $W_1$ and amplified by amplifier 54, a current is established in drive winding 56 which acts to switch the core 50 to the second above-mentioned state. Subsequent negative voltage pulses appearing on word line $W_1$ will be prevented by diode 58 from causing the core 50 to switch back to the first state.

The switching of core 50 from the first to the second state of magnetization, will induce a pulse in the sense winding 60 which will be coupled to the drive winding 62 of core 52. The application of the pulse to the drive winding 62 will act to switch the core 52 from the first to the second state of its magnetization unless a current pulse is simultaneously applied to the inhibit line to effectively counteract the flux change in core 52 which would otherwise be initiated by the current in drive winding 62.

For an understanding of when and why current pulses should be applied to the inhibit line, attention is called to the table illustrated in FIG. 5. Assume initially that it is merely desired to determine which stored words are equal to the search word. If it be assumed that a match between a stored word and a search word is indicated by the core 52 remaining in its first state of magnetization after the completion of a search, it is essential to never generate a pulse on the inhibit line. That is, when an equality criterion is employed, it is desired that the magnetic core 52 switch to a second state of magnetization in response to any positive pulses appearing on the associated word line. Consequently, line *m* of FIG. 4 indicates that no inhibit pulses are generated when an equality criterion is employed.

However, assume that a search is being conducted and an "equal to" or "less than" criterion is being employed. In such a case, it is desired to inhibit the switching of core 52 during those time slots when the search bit is a 1 as shown in the table of FIG. 5 and line *n* of FIG. 4. This is so because positive pulse developed on the word line during the time slots when the search bit is a 1 means of course that the stored bit is a zero which in turn means that the stored word is in fact equal to or less than the search word and as a consequence the stored word matches the search word and and therefore the core 52 should remain in its first state of magnetization indicating a match condition.

In an opposite manner, as described by the table of FIG. 5 and illustrated in line *p* of FIG. 4, when the search criterion is "equal to or greater than," inhibit pulses should be generated during those time slots when search bits equal to 0 are being processed.

FIG. 6 illustrates a logical circuit for appropriately generating the inhibit pulses illustrated in lines $n$ and $p$ of FIG. 4. More particularly, a conventional set-reset flip-flop 70 is provided which is switched to a true state whenever an "equal to or greater than" criterion is to be established, and which is switched to a false state whenever an "equal to or less than" criterion is to be established. Assume that an "equal to or greater than" criterion is to be established and consequently the flip-flop 70 is in a true state. In response to the generation of a timing pulse $t_1$, AND gate 72 will provide an output pulse if the most significant search bit $S_1$ is a binary 0. The output of AND gate 72 is connected to the input of an OR gate 74 whose output is connected to the inhibit line. Similarly, the true output terminal of flip-flop 70 is connected to the inputs of AND gates 76, 78, 80 and 82 along with the respective output terminals $T_2$, $T_3$, $T_4$, and $T_5$ of counter 40. It should be apparent that so long as flip-flop 70 is in a true state, that is manifesting an "equal to or greater than" search comparison criterion, a pulse will be generated on the inhibit line during each time slot in which the search bit is equal to 0. If, for example, all of the search bits are equal to 1, inhibit pulses will be generated during every time slot and as a consequence none of the cores 52 could ever be switched to their mismatch states. This of course is correct inasmuch as no stored words could possibly be greater than a search word all of whose bits were equal to binary 1.

The false output terminal of flip-flop 70 is connected to the inputs of each of the AND gates 84, 86, 88, 90, and 92. The true output terminals of the flip-flops of search register are respectively applied to the inputs of the AND gates 84, 86, 88, 90, and 92 together with hte output terminals $T_1$ through $T_5$ of counetr 40. In response to the generation of timing pulse $t_1$, and assuming the flip-flop 70 to be in a false state. OR gate 84 will generate an inhibit pulse if the first search bit $S_1$ is a binary 1. This means that if the search criterion is "equal to or less than," the core 52 is prevented from switching to a mismatch state if the first search bit is a binary 1 inasmuch as a positive voltage pulse on a word line developed when the search bit is a 1 and the criterion is "equal to or less than" actually constitutes a match condition and the core 52 should be prevented from switching since such switching would specify a mismatch condition. It should be undersood that in order to conduct only an "equality" search, the inhibit signal should never be generated. In order to prevent the inhibit signal from being generated, it can be applied to an AND gate (not shown) together with the complement of a signal indicating "equality" only.

The selection circuit 49 has N output terminals and comprises a commutator type device for sequentially selecting, by energization of appropriate output terminals, the cores 52 which remain in a first state of magnetization after the content addressable memory has completed a search. Any one of several differently designed devices could perform the functions required of the circuit. A typical circuit 49 could be connected to each of the cores 52 by both a drive winding and a sense winding. Each of the drive windings could be sequentially pulsed and the corresponding sense windings can be sensed to thereby sequentially determine the states of each of the cores 52. The cores 52 remaining in a first state of magnetization of course indicate which of the words in the memory matched the search word. The energized output terminals of selection circuit 49 are used to read corresponding words out of the memory matrix 10 and into output register 13. It should be appreciated that it is desirable to incorporate, in the system of FIG. 1, the capability of reading matching words out of the memory matrix after a magnitude comparison search has been performed or after an equality search has been performed on less than all the bits of a stored word; i.e. where certain bits in the search register are masked by inhibiting a current change in the digit line associated therewith by means not shown.

For the purpose of reading out of the memory matrix 10, a plurality of word select lines is provided with each being threaded through the interrogation apertures of all of the memory elements of a different word location. That is, for example, word select line WS1 is threaded through the interrogation apertures of all of the row 1 memory elements. In addition a plurality of digits sense lines are provided with each being threaded through the sense apertures of all of the memory elements in a different column. That is, for example, digit sense line DS1 is threaded through the sense apertures in all of the column 1 memory elements.

Each word select line is connected to the output of a different AND gate 94, each of whose inputs respectively comprise a different selection device output terminal and the true output terminal of a selectively controllable read control flip-flop 96.

Each digit sense line is connected to the input of a different bit sense amplifier such that, for example, digit sense line DS1 is connected to the input of sense amplifier SAB1. The output of each bit sense amplifier is connected to the input of a different stage of the output register 13.

In the operation of the embodiment of FIG. 1, when it is desired to conduct a search with respect to a search word and then read out the matching words in the matrix 10, the search control flip-flop 43 is set and a search word is transferred from the input register 11 to the search register 12. Appropriate current changes are then developed on the digit lines resulting in the selection device 48 energizing one of its output terminals. The search control flip-flop 43 is then reset and the read control flip-flop 96 is set and as a consequence, a current is driven through the word select line associated with the energized selection device output terminal. The current driven through the word select line which is threaded through interrogation apertures causes output signals indicative of the memory element contents to be developed on the digit sense lines and applied to the bit sense amplifiers for transfer into the output register 13.

Figure 3:
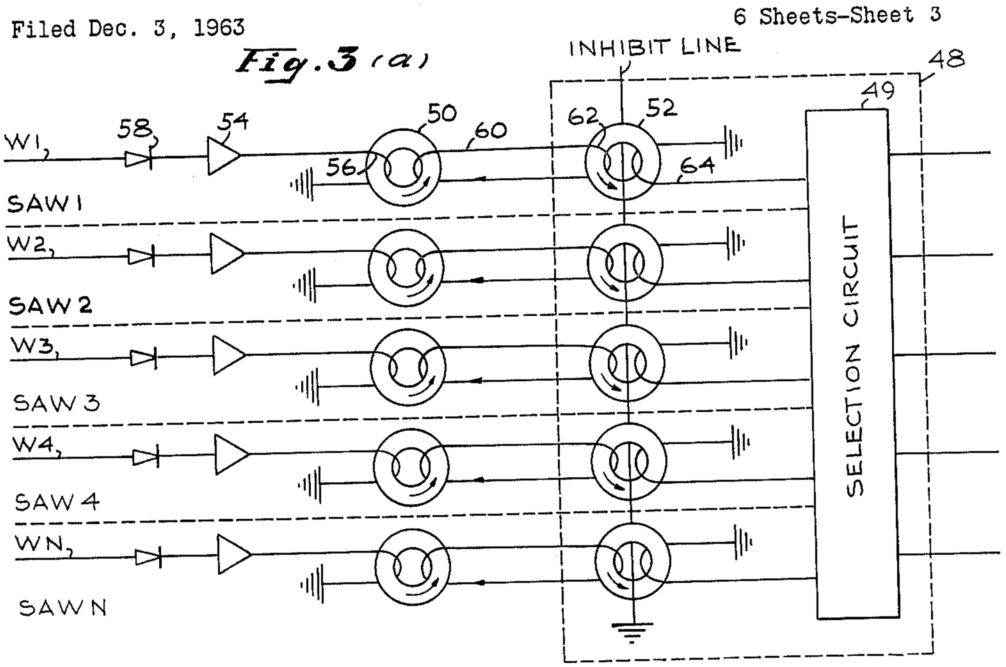
Figure 3:
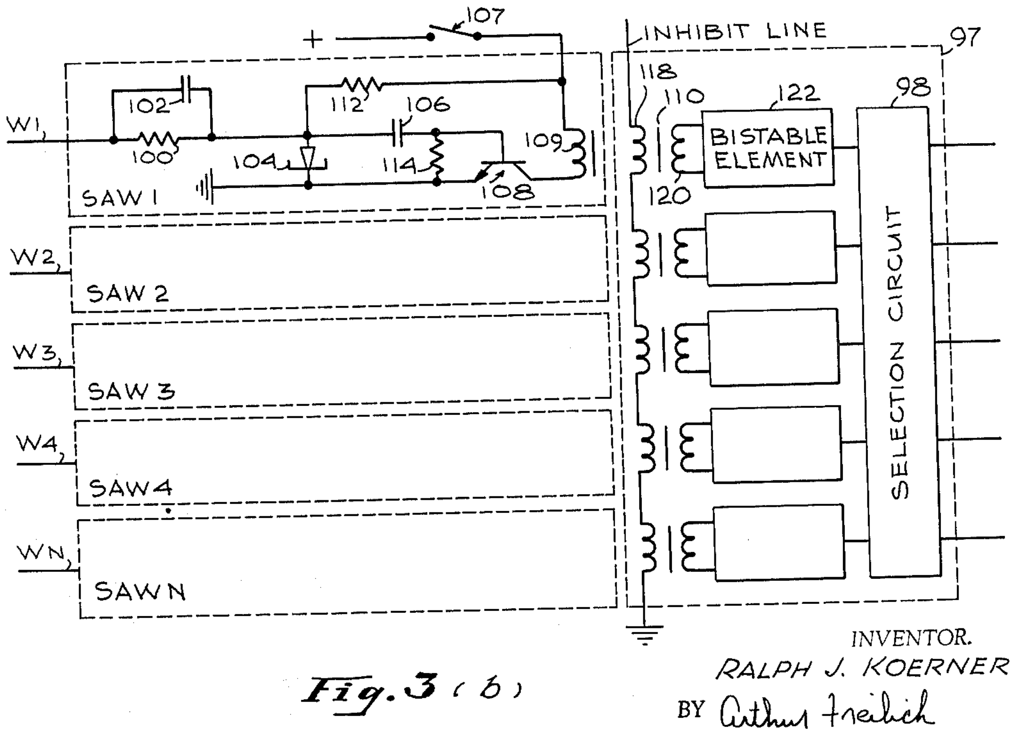

Attention is now called to FIG. 3$b$ which illustrates a second embodiment of the sensing apparatus adapted to be utilized with the content addressable memory of FIG. 1. The sensing apparatus of FIG. 3$b$ is comprised of N sense amplifiers and a selection device 97 having N stages and a selection circuit 98. Detailed attention will again be directed only to the apparatus connected to word line $W_1$.

Word line $W_1$ is connected through a parallel RC circuit including resistor 100 and capacitor 102 to the first terminal of a tunnel diode 104 whose second terminal is grounded. The first terminal of the tunnel diode 104 is in turn connected through a capacitor 106 to the base of a transistor switch 108. The emitter of the transistor 108 is connected to ground while the collector of the transistor 108 is connected through a first primary winding 109, wound about transformer core 110, through a switch 107 to a positive potential source. A resistor 112 connects the positive potential source to the first terminal of the tunnel diode 104. A resistor 114 connects the base of the transistor 108 to ground.

A second primary winding 118 on the transformer core 110 is connected to an inhibit line which in turn is connected to the ouput of the previously mentioned OR gate 74 of FIG. 6. A secondary winding 120 on the transformer core 110 is connected to a bistable element 122 which in turn is connected to a selection circuit 98.

In the operation of the selection apparatus of FIG. 3$b$, assume that switch 107 closes in response to the generation of timing pulse $t_0$ and that as a consequence the tunnel diode 104 assumes its first state, that is a high current, low voltage state. When a positive voltage pulse is applied to the word line $W_1$, it is coupled through the RC circuit to the first terminal of tunnel diode 104 and as a consequence switches the tunnel diode to its second state, that is a low current, high voltage state. Once the tunnel diode has switched to a high voltage state, subsequent positive or negative pulses on the word line $W_1$ will not change the state of the tunnel diode. The switching of the tunnel diode 104 to its high voltage state, couples a positive voltage with respect to ground through capacitor 106 to the base of transistor 108. As a consequence, current is initiated in the collector-emitter path of transistor 108 and the first primary winding 109 which is connected in series therewith. The current initiated in the first primary winding 109 will induce a pulse in the secondary winding 120 which in turn will switch the bistable element 122 from a first to a second (mismatch) state unless the inhibit line simultaneously applies a pulse to the second primary winding 118. As previously described, pulses are applied to the inhibit line when an "equal to or greater than" search criterion is being employed and the search bit is a 0, or when an "equal to or less than" search criterion is being employed and the search bit is a 1. The selection circuit 98 can then, upon the termination of the search period, that is after the occurrence of timing pulse $t_6$, sequentially sample the bistable elements 122 to determine which stored words match the search word, within the terms of the established criterion. The output terminals of the selection circuit 98 can be coupled to AND gates 70 of FIG. 1 as was explained for the output terminals of selection circuit 49.

Although the parallel readout system of FIG. 1 is extremely useful where maximum operational speed is desired, it has certain significant deficiencies which, in certain respects, make a parallel readout system, as for example illustrated in FIG. 7, more attractive where a slower speed can be tolerated. The initial deficiency of the system of FIG. 1 is that it cannot be conveniently utilized with a certain subclass of the class of magnetic elements having the characteristic described by FIG. 2*b*. One member of this subclass is the previously mentioned wire memory. The reason that the system of FIG. 1 is not suitable for use with a wire element memory is because such a memory must be read in a serial fashion since the individual elements thereof are, in a word oriented memory, inherently coupled to the same sense line. That is, if only one memory element is to be utilized per stored bit of information, digit sense lines cannot be coupled to the element in columnar fashion.

An additional undesirable aspect of the readout system of FIG. 1 is attributable to its relatively high cost resulting from basically two factors; namely the plurality of bit sense amplifiers required and the alternating threading required through the memory matrix elements. Note that the digit sense and word select lines cannot be threaded directly through aligned apertures as can the digit lines and word lines, but instead must have an alternating direction. For example, consider word select line WS1 which must be threaded through the interrogation apertures of each of the elements in row 1. Since the interrogation apertures are extending vertically in order to permit the digit lines to be directly threaded through aligned apertures, the word sense line must alternate. Similarly, the digit sense line must alternate in direction inasmuch as the sense apertures are disposed horizontally in order to align the sense apertures for the word lines. Since the cost of the memory matrix is to a great extent dependent upon the labor required to thread the elements thereof, and since it is exceedingly more difficult to thread the lines in an alternating direction than it is to thread them through aligned apertures, the cost of the memory matrix of FIG. 1 is significantly higher than the cost of the memory matrix of FIG. 7 which does not require any additional lines in the memory matrix to effect a readout operation.

In the embodiment of FIG. 7, searching is accomplished in essentially the same manner as in FIG. 1. That is, in response to a search control flop-flop 200 being set, the contents of an input register 202, at time $t_0$, are transferred through AND gates 204 and entered into the stages of the search register 12. The sequencing of the counter 40, driven by clock source 41, develops match and mismatch signals on the word lines which are sensed by the sense amplifiers and applied to a selection device which in turn functions to uniquely energize one of its output terminals. Readout of the word associated with the uniquely energized selection device output terminals is then effected in response to the read control flip-flop 206 being selectively set.

The true output terminal of flip-flop 206 is connected to the input of AND gate 208 along with the output terminal $T_0$ of counter 40. The output of AND gate 208 is connected to the input of OR gate 33 in each stage of the search register 12. That is, in order to initiate a read operation according to the embodiment of FIG. 7, the stages of the search register are all cleared to a 1 state.

Each of the selection device output terminals is connected to the input of a different one of AND gates 210 together with the output of the sensing device associated therewith. That is, the output terminal of the selection device responsive to match and mismatch signals appearing on word line $W_1$ will be connected to the input of a first AND gate 210 along with the output of sense amplifier SAW1 which functions to sense signals appearing on word line $W_1$. The true output terminal of read control flip-flop 206 is connected to the input of each of AND gates 210. The outputs from all of the AND gates 210 are connected to the input of an OR gate 212 whose output is connected to the data input terminal of a shift register 214 which serves the same function as the output register 13 of FIG. 1. The clock source 41 is connected to the clock pulse input terminal of shift register 214.

In the utilization of the apparatus of FIG. 7, a search is initially conducted to find words stored in the memory matrix 10 which match, according to a defined criteria, the search word transferred from the input register 202 into the search register 12. As a result of the search, one of the selection device output terminals is energized. Subsequently, the search control flip-flop 200 is reset and the read control flip-flop 206 is set to store a 1 in each stage of the search register 12. The counter is then incremented and as a consequence current changes are sequentially developed on the digit lines. That is, a search for a 1 is initially conducted with respect to the elements in column 1, followed by sequential searches with respect to the elements of columns 2 through 5. Considering the elements of row 1, for example, the increasing current in the digit line of column 1 will provide a negative pulse on word line $W_1$ inasmuch as the row 1-column 1 element stores a 1. This negative pulse will be sensed by the sensing device SAW1 and coupled through the first AND gate 210 and the OR gate 212 to the data input terminal of shift register 214. In response to a subsequent pulse provided by the clock source 41, the counter will be incremented to a $t_2$ state resulting in the increase in current in the digit line of column 2 and again providing a negative pulse on word line $W_1$. This negative pulse will again be sensed as a 1 and will be coupled to the data input terminal of shift register 214, the previous 1 indication having been shifted to the left one stage. In response to a subsequent pulse provided by clock source 41, a current increase will be developed in digit line $D_3$ which will result in the application of a positive pulse to word line $W_1$. Again, this positive pulse, representative of a 0, will be sensed by sense amplifier SAW1 and coupled through AND gate 210 and OR gate 212 to the data input terminal of shift register 214. Consequently, it should be realized that where a reduced operating speed can be tolerated such that readout can be effected in a serial manner as in FIG. 7, as distinguished from the parallel readout of FIG. 1, considerable cost reduction can be effected. The cost reduction results from the fact that the embodiment of FIG. 7 does not require the introduction of any sense amplifiers for the readout operation which are not already required for the search operation and because it does not require the provision of any additional matrix lines (particularly no lines having an alternating direction) over what is required for the search operation.

The sensing apparatus utilized with the embodiment of FIG. 7 is illustrated in FIGS. 8*a* and 8*b* and it is to be noted that aside from relatively minor modifications, the apparatus is the same as that illustrated in FIGS. 3*a* and 3*b* for use with the embodiment of FIG. 1. Modification is required because the sensing devices connected to each of the word lines in FIG. 7 must be reset between the successive development of output pulses on the word lines. More particularly, it will be recalled that during a search operation, it is only necessary to ascertain the state of the search bit involved in the development of the initial mismatch signal on each word line and that the development of subsequent match or mismatch signals can be ignored. Of course, in order to read out the contents of an entire word, none of the signals can be ignored and therefore the sensing devices must be reset between each successive application of output pulses to the word lines.

In order to reset the sensing devices of FIG. 8*a*, an OR gate 216 is provided whose inputs respectively comprise the output terminals $T_1$ through $T_5$ of the counter 40. The output of the OR gate 216 is connected to the input of an AND gate 218 along with the true output terminal of the read control flip-flop 206. The output of AND gate 218 is connected to the input of OR gate 220 along with the output terminal $T_0$ of counter 40. The output of OR gate 220 is connected to the input of a delay multivibrator 222 whose output is coupled to each of the sensing device cores 50.

In operation, the delay multivibrator 222 is energized by the output of OR gate 220 to switch from a first to a second state. The multivibrator 222 will remain in the second state for a desired delay period and thence will fall back to its first state. The transition of the multivibrator from its second to its first state functions to reset the cores 50 to a state of magnetization indicated by the arrows thereon. The delay multivibrator 222 is energized at time $t_0$ regardless of whether a search or a read operation is going to be initiated. It is energized at times $t_1$ through $t_5$ only in the course of a read operation, that is, when read control flip-flop 206 is true and provides an enabling input to AND gate 218. The winding 60 coupling each of the cores 50 to the selection device can also be utilized to couple each of the cores to the AND gates 210 of FIG. 7. The delay introduced by the multivibrator 222 serves the purpose of resetting the cores 50 after they have sensed pulses provided on the associated word lines and prior to the development of a subsequent pulse on the word line. That is, at time $t_1$, a pulse will be provided on the word line $W_1$ indicative of the state of the row 1-column 1 element and the delay multivibrator 222 will be energized. Subsequently, and prior to time $t_2$, the cores 50 will be reset.

The sense amplifiers of FIG. 8*b* are modified in substantially the same manner as the apparatus of FIG. 8*a*. That is, the delay multivibrator 222 and gates 216, 218, and 220 are used to periodically shift the state of the tunnel diode 104 to its high current low voltage condition. The appearance of a subsequent positive pulse on the word line will switch the tunnel diode to its high voltage state while the appearance of a negative pulse on the word line will fail to switch the state of the tunnel diode. The state of the tunnel diode of course controls the conduction of the transistor 108 and consequently the potential on the collector of the transistor will indicate the state of the sensed element. The collector of the transistor 108 can be coupled to the input of AND gate 210 of FIG. 7.

Attention is now called to FIG. 9*a* which illustrates the details of a wire memory element and FIG. 9*b* which schematically illustrates how the wire memory element can be utilized in a content addressable memory configuration substantially identical to that disclosed herein for orthogonal aperture magnetic cores. The individual element of FIG. 9*a* includes a digit solenoid or line 300 which extends around a wire comprised of a conductive substrate, e.g. copper 304, coated with a magnetic storage film 306 having circumferential uniaxial anisotropy. In the element of FIG. 9*a* information is stored on the surface of the magnetic storage film 306 immediately under the digit line 300. Binary information is represented on the storage film in terms of the direction of the circumferential magnetic field in the film. Readout of the information is effected by passing a current through the digit line which will develop signals on the conductive substrate 302 of the type illustrated in FIG. 2*b*. In the assembly of a plurality of elements of the type illustrated in FIG. 9*a*, into a memory matrix, they are advantageously arranged as shown in FIG. 9*b* with all of the elements of a word comprising areas of storage film deposited on the same conductive substrate. Consequently, readout of information so stored must be effected in a serial fashion inasmuch as the readout pulses will all appear on the same conductive substrate and could not be distinguished, if a parallel or simultaneous readout technique were utilized. Thus, the serial readout system of FIG. 7 ideally suits a content addressable memory comprised of memory elements of the wire type.

From the foregoing, it should be appreciated that two readout system embodiments have been disclosed herein for utilization with a content addressable memory. It has been pointed out that the initial embodiment has the advantage of speed inasmuch as all of the bits of a word can be read out simultaneously. However, it has been shown that the embodiment of FIG. 7 which causes bits of a word to be read out in a serial fashion, is considerably less expensive inasmuch as it does not require the provision of any additional matrix wiring or sense amplifiers over that which is required to perform search operations. The cost saving in the embodiment of FIG. 7 results effectively from the fact that the equipment utilized to sequentially activate each of the digit lines for search operations is time shared so as to function as well for readout operations.

The embodiments of the invention in which an exclusive property or privilege is claimed are defined as follows:

1. A content addressable memory comprising:

a matrix of memory elements respectively including N rows of elements, each row comprising a memory location capable of storing a word, and Q columns of elements, each column including a correspondingly positioned memory element from each location;

Q storage elements;

a plurality of digit lines each of which is associated with all of the elments of a different one of said matrix columns and a different one of said Q storage elements;

a plurality of word lines each of which is associated with all of the elements of a different one of said matrix rows;

driver means energizable to sequentially apply signals to said digit lines, each signal respectively representative of the state of a different one of said Q storage elements;

means for developing a match signal at each of said memory elements and applying it to the word line associated therewith when its state matches the state of the storage element represented by the signal applied to the digit line associated therewith;

means for developing a mismatch signal at each of said memory elements and applying it to the word line associated therewith when its state does not match the state of the storage element represented by the signal applied to the digit line associated therewith;

search control means selectively actuatable to enter a search word into said Q storage elements and to energize said driver means;

means for selecting one of said memory locations;

a selectively actuatable read control means;

an output register; and means responsive to the actuation of said read control means for transferring the word stored in said selected memory location to said output register.

2. A content addressable memory comprising:

a matrix of memory elements respectively including N rows of elements, each row comprising a memory location capable of storing a word, and Q columns of elements, each column including a correspondingly positioned memory element from each location;

Q storage elements;

a plurality of digit lines each of which is associated with all of the elements of a different one of said matrix columns and a different one of said Q storage elements;

a plurality of word lines each of which is associated with all of the elements of a different one of said matrix rows;

driver means energizable to sequentially apply signals to said digit lines, each signal respectively representative of the state of a different one of said Q storage elements;

means for developing a match signal at each of said memory elements and applying it to the word line associated therewith when its state matches the state of the storage element represented by the signal applied to the digit line associated therewith;

means for developing a mismatch signal at each of said memory elements and applying it to the word line associated therewith when its state does not match the state of the storage element represented by the signal applied to the digit line associated therewith;

search control means selectively actuatable to enter a search word into said Q storage elements and to energize said driver means;

selection device means coupled to said word lines and responsive to said match and mismatch signals for selecting one of said memory locations;

a selectively actuatable read control means;

an output register; and means responsive to the actuation of said read control means for transferring the word stored in said selected memory location to said output register.

3. A content addressable memory comprising:

a matrix of memory elements respectively including N rows of elements, each row comprising a memory location capable of storing a word, and Q columns of elements, each column including a correspondingly positioned memory element from each location;

Q storage elements;

a plurality of digit lines each of which is associated with all of the elements of a different one of said matrix columns and a different one of said Q storage elements;

a plurality of word lines each of which is associated with all of the elements of a different one of said matrix rows;

driver means energizable to sequentially apply signals to said digit lines, each signal respectively representative of the state of a different one of said Q storage elements;

means for developing a match signal at each of said memory elements and applying it to the word line associated therewith when its state matches the state of the storage element represented by the signal applied to the digit line associated therewith;

means for developing a mismatch signal at each of said memory elements and applying it to the word line associated therewith when its state does not match the state of the storage element represented by the signal applied to the digit line associated therewith;

search control means selectively actuatable to enter a search word into said Q storage elements and to energize said driver means;

selection device means coupled to said word lines and responsive to said match and mismatch signals for selecting one of said memory locations;

read control means selectively actuatable to clear said Q storage elements and to energize said driver means;

a shift register; and means responsive to the actuation of said read control means for applying signals sequentially applied to the word line of said selected memory location, to said shift register.

4. The content addressable memory of claim 1 including:

a plurality of digit sense lines each of which is associated with all of the elements of a different one of said matrix columns;

a plurality of word select lines each of which is associated with all of the elements of a different one of said matrix rows;

said selection device means having a plurality of input terminals and a plurality of output terminals respectively connected to said plurality of word lines and said plurality of word select lines; and sense amplifier means coupling all of said digit sense lines to said output register for parallel communication therebetween.

5. A content addressable memory comprising:

a matrix of memory elements respectively including N rows of elements, each row comprising a memory location capable of storing a word, and Q columns of elements, each column including a correspondingly positioned memory element from each location;

each of said memory elements comprising a ferrite core having a pair of perpendicularly oriented interrogation and sense holes extending therethrough;

Q storage elements;

a plurality of digit lines each of which is threaded through the interrogation hole of all of the elements of a different one of said matrix columns and associated with a different one of said Q storage elements;

a plurality of word lines each of which is threaded through the sense hole of all of the elements of a different one of said matrix rows;

driver means energizable to sequentially apply signals to said digit lines, each signal respectively representative of the state of a different one of said Q storage elements;

means for developing a match signal at each of said memory elements and applying it to the word line associated therewith when its state matches the state of the storage element represented by the signal applied to the digit line associated therewith;

means for developing a mismatch signal at each of said memory elements and applying it to the word line associated therewith when its state does not match the state of the storage element represented by the signal applied to the digit line associated therewith;

search control means selectively actuatable to enter a search word into said Q storage elements and to energize said driver means;

selection device means coupled to said word lines and responsive to said match and mismatch signals for selecting one of said memory locations;
read control means selectively actuatable to clear said Q storage elements and to energize said driver means;
a shift register; and
means responsive to the actuation of said read control means for applying signals sequentially applied to the word line of said selected memory location, to said shift register.

6. A content addressable memory comprising:
a matrix of memory elements respectively including N rows of elements, each row comprising a memory location capable of storing a word, and Q columns of elements, each column including a correspondingly positioned memory element from each location;
each of said memory elements comprising a ferrite core having a pair of perpendicularly oriented interrogation and sense apertures extending therethrough;
Q storage elements;
a plurality of digit lines each of which is threaded through the interrogation hole of all of the elements of a different one of said matrix columns and associated with a different one of said Q storage elements;
a plurality of word lines each of which is threaded through the sense hole of all of the elements of a different one of said matrix rows;
driver means energizable to sequentially apply signals to said digit lines, each signal respectively representative of the state of a different one of said Q storage elements;
means for developing a match signal at each of said memory elements and applying it to the word line associated therewith when its state matches the state of the storage element represented by the signal applied to the digit line associated therewith;
means for developing a mismatch signal at each of said memory elements and applying it to the word line associated therewith when its state does not match the state of the storage element represented by the signal applied to the digit line associated therewith;
search control means selectively actuatable to enter a search word into said Q storage elements and to energize said driver means;
selection device means coupled to said word lines and responsive to said match and mismatch signals for selecting one of said memory locations;
a plurality of digit sense lines each of which is threaded through the sense apertures of all of the elements of a different one of said matrix columns;
a plurality of word select lines each of which is threaded through the interrogation aperture of all of the elements of a different one of said matrix rows;
said selection device means having a plurality of input terminals and a plurality of output terminals respectively connected to said plurality of word lines and said plurality of word select lines;
an output register; and
sense amplifier means coupling all of said digit sense lines to said output register for parallel communication therebetween.

7. A content addressable memory comprising:
a matrix of memory elements respectively including N rows of elements, each row comprising a memory location capable of storing a word, and Q columns of elements, each column including a correspondingly positioned memory element from each location;
each of said memory elements comprising a magnetic coating deposited on a conductive wire;
Q storage elements;
a plurality of digit solenoids each of which is coupled to the elements of a different one of said matrix columns and associated with a different one of said Q storage elements;

a plurality of word lines each of which comprises an integrally formed wire including the conductive wire of all memory elements common to a different one of said rows;
means for developing a match signal at each of said memory elements and applying it to the word line associated therewith when its state matches the state of the storage element represented by the signal applied to the digit solenoid associated therewith;
means for developing a mismatch signal at each of said memory elements and applying it to the word line associated therewith when its state does not match the state of the storage element represented by the signal applied to the digit solenoid associated therewith;
search control means selectively actuatable to enter a search word into said Q storage elements and to energize said driver means;
selection device means coupled to said word lines and responsive to said match and mismatch signals for selecting one of said memory locations;
read control means selectively actuatable to clear said Q storage elements and to energize said driver means;
a shift register; and
means responsive to the actuation of said read control means for applying signals sequentially applied to the word line of said selected memory location, to said shift register.

8. A content addressable memory comprising:
a matrix of memory elements respectively including N rows of elements, each row comprising a memory location capable of storing a word, and Q columns of elements, each column including a corresponding memory element from each location;
Q storage elements;
a plurality of digit lines each of which is associated with all of the elements of a different one of said matrix rows and a different one of said Q storage elements;
a plurality of word lines each of which is associated with all of the elements of a different one of said matrix rows;
each of said memory elements being respectively responsive to changes in current in opposite first and second directions on a digit line associated therewith for respectively providing pulses of opposite first and second going polarities on a word line associated therewith when said memory element is in a first state and for respectively providing pulses of second and first going polarities when said memory element is in a second state;
means for selectively initiating a search operation and for entering the bits of a search word into said Q storage elements;
means for selectively initiating a read operation and for clearing said Q storage elements;
means for sequentially applying signals to said digit lines, each signal respectively representative of the state of a different one of said Q storage elements;
means for sensing the polarity of pulses on each of said word lines;
a selection device connected to said means for sensing and including N output lines each associated with a different one of said word lines;
means in said selection device for applying a unique signal to one of said selection device output lines in response to the polarity of pulses sensed on said word lines; and
means responsive to the initiation of said read operation for sensing the word line associated with said selection device output line to which said unique signal is applied.

9. A content addressable memory comprising:
a matrix of memory elements respectively including N rows of elements, each row comprising a memory location capable of storing a word, and Q columns of elements, each column including a corresponding memory element from each location;
Q storage elements;
a plurality of digit lines each of which is associated with all of the elements of a different one of said matrix rows and a different one of said Q storage elements;
a plurality of word lines each of which is associated with all of the elements of a different one of said matrix rows;
each of said memory elements being respectively responsive to changes in current in opposite first and second directions on a digit line associated therewith for respectively providing pulses of opposite first and second going polarities on a word line associated therewith when said memory element is in a first state and for respectively providing pulses of second and first going polarities when said memory element is in a second state;
means for selectively initiating a search operation and for entering the bits of a search word into said Q storage elements;
means for selectively initiating a read operation and for clearing said Q storage elements;
means for sequentially applying signals to said digit lines, each signal respectively representative of the state of a different one of said Q storage elements;
means for sensing the polarity of pulses on each of said word lines;
a selection device connected to said means for sensing and including N output lines each associated with a different one of said word lines;
means in said selection device for applying a unique signal to one of said selection device output lines in response to the polarity of pulses sensed on said word lines;
a shift register having a data input terminal and a shift pulse input terminal;
means applying pulses to said shift register shift pulse input terminal in synchronism with said signals sequentially applied to said digit lines; and
means responsive to the initiation of said read operation for coupling the word line associated with said selection device output line to which said unique signal is applied, to said shift register data input terminal.

10. A content addressable memory comprising:
a matrix of memory elements respectively including N rows of elements, each row comprising a memory location capable of storing a word, and Q columns of elements, each column including a corresponding memory element from each location;
Q storage elements;
a plurality of digit lines each of which is associated with all of the elements of a different one of said matrix rows and a different one of said Q storage elements;
a plurality of word lines each of which is associated with all of the elements of a different one of said matrix rows;
each of said memory elements being respectively responsive to changes in current in opposite first and second directions on a digit line associated therewith for respectively providing pulses of opposite first and second going polarities on a word line associated therewith when said memory element is in a first state and for respectively providing pulses of second and first going polarities when said memory element is in a second state;
a cyclic counter capable of defining a plurality of states;
means for selectively initiating a search operation and for entering the bits of a search word into said Q storage elements;
means for selectively initiating a read operation and for clearing said Q storage elements;
means for applying a signal representative of the state of a different one of said Q storage elements to each of said digit lines during a different one of said counter states;
means for sensing the polarity of pulses on each of said word lines;
a selection device connected to said means for sensing and including N output lines each associated with a different one of said word lines;
means for applying a unique signal to one of said selection device output lines in response to the polarity of pulses sensed on said word lines;
a shift register having a data input terminal and a shift pulse input terminal;
a source of clock pulses coupled to said counter and said shift pulse input terminal; and
means responsive to the initiation of said read operation for coupling the word line associated with said selection device output line to which said unique signal is applied, to said shift register data input terminal.

11. A content addressable memory comprising:
a matrix of memory elements respectively including N rows of elements, each row comprising a memory location capable of storing a word, and Q columns of elements, each column including a corresponding memory element from each location;
Q storage elements;
a plurality of digit lines each of which is associated with all of the elements of a different one of said matrix rows and a different one of said Q storage elements;
A plurality of word lines each of which is associated with all of the elements of a different one of said matrix rows;
each of said memory elements being respectively responsive to changes in current in opposite first and second directions on a digit line associated therewith for respectively providing pulses of opposite first and second going polarities on a word line associated therewith when said memory element is in a first state and for respectively providing pulses of second and first going polarities when said memory element is in a second state;
a cyclic counter capable of defining a plurality of states;
means for selectively initiating a search operation and for entering the bits of a search word into said Q storage elements;
means for selectively initiating a read operation and for clearing said Q storage elements;
means for applying a signal representative of the state of a different one of said Q storage elements to each of said digit lines during a different one of said counter states;
N sense amplifiers each having an input terminal and an output terminal, each input terminal connected to a different one of said word lines for sensing the polarity of pulses occurring thereon;
a selection device having N input terminals and N output terminals, each input terminal connected to a different one of said sense amplifier output terminals;
means in said selection device responsive to the polarities of pulses sensed by said sense amplifiers for applying a unique signal to one of said selection device output lines;
N AND gates each having first, second, and third input terminals and an output terminal, each first input terminal connected to a different one of said sense amplifier output terminals and each second input terminal connected to a different one of said selection device output terminals;
an OR gate having N input terminals and an output terminal, each input terminal connected to a different one of said AND gate output terminals;

a shift register having a data input terminal and a shift pulse input terminal;

a source of clock pulses coupled to said counter and said shift pulse input terminal; and means coupling said means for selectively initiating a read operation to each of said AND gate third input terminals.

References Cited by the Examiner

UNITED STATES PATENTS

| | | | |
|---|---|---|---|
| 3,047,843 | 7/1962 | Katz | 340—146.2 |
| 3,111,580 | 11/1963 | Keefer | 340—174 |
| 3,195,114 | 7/1965 | Gunderson | 340—174 |

IRVING L. SRAGOW, *Primary Examiner.*

M. S. GITTES, *Examiner.*